US010708421B2

United States Patent
Diriye et al.

(10) Patent No.: US 10,708,421 B2
(45) Date of Patent: Jul. 7, 2020

(54) FACILITATING PERSONALIZED DOWN-TIME ACTIVITIES

(71) Applicant: International Business Machines Corporation, Armonk, NY (US)

(72) Inventors: Abdigani Diriye, Nairobi (KE); Shikhar Kwatra, Morrisville, NC (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/961,813

(22) Filed: Apr. 24, 2018

(65) Prior Publication Data

US 2019/0327361 A1 Oct. 24, 2019

(51) Int. Cl.
| | |
|---|---|
| *H04M 3/00* | (2006.01) |
| *H04M 3/428* | (2006.01) |
| *H04L 29/08* | (2006.01) |
| *G06F 16/435* | (2019.01) |

(52) U.S. Cl.
CPC ........ *H04M 3/4285* (2013.01); *G06F 16/435* (2019.01); *H04L 67/306* (2013.01)

(58) Field of Classification Search
CPC ........................... H04M 3/4285; G06F 16/435
USPC ....... 379/266.01–266.1, 265.01–265.14, 309
See application file for complete search history.

(56) References Cited

U.S. PATENT DOCUMENTS

| | | | |
|---|---|---|---|
| 6,301,354 B1 * | 10/2001 | Walker | H04M 3/428 379/265.02 |
| 6,400,484 B1 | 6/2002 | Bilder | |
| 6,400,804 B1 * | 6/2002 | Bilder | H04M 3/428 379/114.13 |
| 6,404,858 B1 | 6/2002 | Farris et al. | |
| 6,442,567 B1 * | 8/2002 | Retallick | G06Q 10/0633 707/999.003 |
| 6,658,093 B1 | 12/2003 | Langseth et al. | |
| 6,687,696 B2 | 2/2004 | Hofmann et al. | |

(Continued)

OTHER PUBLICATIONS

Peter Mell et al., "The NIST Definition of Cloud Computing". Special Publication 800-145. NIST. Sep. 2011, pp. 1-7.

(Continued)

*Primary Examiner* — William J Deane, Jr.
(74) *Attorney, Agent, or Firm* — Eyal Gilboa; Otterstedt, Wallace & Kammer, LLP

(57) ABSTRACT

A method includes producing a user profile in response to user data; obtaining context for estimating the duration of a down-time; estimating the duration of the down-time; determining experience enhancement factors in response to the user profile and the estimated duration of the down-time; determining an activity selection model in response to the context, the user data, and the experience enhancement factors; generating personalized engaging activities by applying the activity selection model to a plurality of potential activities; partitioning the estimated duration of the down-time into segments; sequencing the personalized engaging activities to fit into the segments; and presenting the personalized engaging activities to the user via a computing device. A computer readable medium embodies instructions for the method and an apparatus including a processor is operative to facilitate the method.

20 Claims, 7 Drawing Sheets

(56) References Cited

U.S. PATENT DOCUMENTS

| | | | |
|---|---|---|---|
| 6,724,887 B1 | 4/2004 | Eilbacher et al. | |
| 6,819,759 B1 | 11/2004 | Khuc et al. | |
| 6,829,332 B2 | 12/2004 | Farris et al. | |
| 7,426,268 B2* | 9/2008 | Walker | H04M 3/5166 |
| | | | 379/203.01 |
| 7,916,858 B1 | 3/2011 | Heller et al. | |
| 7,986,776 B2* | 7/2011 | Hamilton, II | G06F 21/6209 |
| | | | 379/266.01 |
| 8,056,618 B2 | 11/2011 | Kumar et al. | |
| 8,107,596 B1* | 1/2012 | Gentle | H04M 11/066 |
| | | | 379/393 |
| 8,630,403 B2 | 1/2014 | Brown et al. | |
| 9,014,360 B2 | 4/2015 | Roberts et al. | |
| 9,560,201 B2 | 1/2017 | Stine et al. | |
| 2003/0129946 A1* | 7/2003 | Giry-Cassan | H03G 3/001 |
| | | | 455/67.11 |
| 2003/0161464 A1 | 8/2003 | Rodriguez et al. | |
| 2006/0182258 A1* | 8/2006 | Sisselman | H04M 3/5175 |
| | | | 379/265.02 |
| 2006/0198505 A1* | 9/2006 | Kortum | H04M 3/4285 |
| | | | 379/201.04 |
| 2007/0047711 A1* | 3/2007 | Florkey | H04M 3/4285 |
| | | | 379/162 |
| 2008/0270230 A1 | 10/2008 | Hendrickson et al. | |
| 2009/0249083 A1* | 10/2009 | Forlenza | G06F 21/6209 |
| | | | 713/193 |
| 2013/0227018 A1* | 8/2013 | Regan | H04L 51/32 |
| | | | 709/204 |
| 2014/0282135 A1 | 9/2014 | Segre | |
| 2016/0140671 A1* | 5/2016 | Hong | G06Q 50/01 |
| | | | 705/319 |
| 2017/0195486 A1 | 7/2017 | Li et al. | |

OTHER PUBLICATIONS

John E Kelly III, "Computing, cognition, and the future of knowing", IBM Corp. Oct. 2015. pp. 1-7.

Ramadan E. Al-Haratani, "Optimizing wait time using smart phones as a patient empowerment tool", Cal. State Univ., Long Beach. Aug. 2010. pp. 1-37.

Charlotte D. Bjoernes et al., "A dialogue-based web application enhances personalized access to healthcare professionals—an intervention study", Medical Informatics and Decision Making 2012, 12:96. Dec. 2012. pp. 1-14.

Xiaming Chen et al., "Passive profiling of mobile engaging behaviours via user-end application performance assessment", Pervasive and Mobile Computing 29. Jul. 2016. pp. 95-112.

Tigineh Mersha, "Enhancing the customer contact model", J. Op. Mgmt. 9:3. Aug. 1990. pp. 391-405.

Soozin Park et al., "Waiting in line at a fashion store: psychological and emotional responses", Fashion and Textiles 2014, 1:21. Dec. 2014. pp. 21-34.

Anton McConville, "Measuring emotion with IBM Watson speech to text and tone analysis", IBM Cloud Blog. Nov. 2016. pp. 1-11.

\* cited by examiner

FACILITATING PERSONALIZED DOWN-TIME ACTIVITIES

BACKGROUND

The present invention relates to the electrical, electronic, and computer arts, and more specifically, to methods and systems for facilitating personalized down-time activities.

Several million users daily call to get a customer service (e.g., for banking service, revenue authority, utility companies, retailers, airlines agents, publishers, etc.). During such calls, most users experience periods of down-time in which they are not interacting with a customer service representative. Service providers implement tools to reduce down-time and improve customer experience, by monitoring the interactions of their customer throughout a service experience, e.g., to improve the quality of service, to understand various characteristics and factors of the customer (and customer agent) such as a perceived level of stress, frustration, etc. Such data can further be consumed by computer algorithms and intelligent applications (i) to infer customer experience, (dis)satisfaction level, sentiment, emotion, etc.; (ii) to infer customer service effectiveness; or (iii) to determine product recommendation, etc.

SUMMARY

Principles of the invention provide techniques for facilitating personalized down-time activities. In one aspect, an exemplary method includes producing a user profile in response to user data; obtaining context for estimating the duration of a down-time; determining, using the context, an estimated duration of the down-time; determining experience enhancement factors in response to the user profile and the estimated duration of the down-time; determining an activity selection model in response to the context, the user data, and the experience enhancement factors; generating personalized engaging activities by applying the activity selection model to a plurality of potential activities; partitioning the estimated duration of the down-time into segments; sequencing the personalized engaging activities to fit into the segments; and presenting the personalized engaging activities to the user via a computing device.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Techniques for real time detection of user's behavior via various monitoring tools coupled with training algorithms for continuous feedback learning aids in providing engaging activities for optimization and sustenance of customer satisfaction levels.

A multi-dimensional output corresponding to the respective set of inputs selected based context analysis, previous user's behavioral and activity pattern and geo-spatial metrics fed in the neural networks model proposed, further assists in providing sequence of activities to the customers accounting for ameliorative steps taken to prevent any recurrent loss in customer's rational behavior.

Dynamically generating effective user activities related to maximizing a customer experience. Example of these activities include generating personalized entertainment (e.g., playing songs, classical sounds, games, short video, radio or podcasts), paying advertisements, educational material (e.g., facts, lecture, session about a new product), alerts (e.g. alerts of relevant information such as athletic scores, stock market changes, new technology, emergency situations), and other amelioration actions.

These and other features and advantages of the present invention will become apparent from the following detailed description of illustrative embodiments thereof, which is to be read in connection with the accompanying drawings.

DETAILED DESCRIPTION

Figure 1:
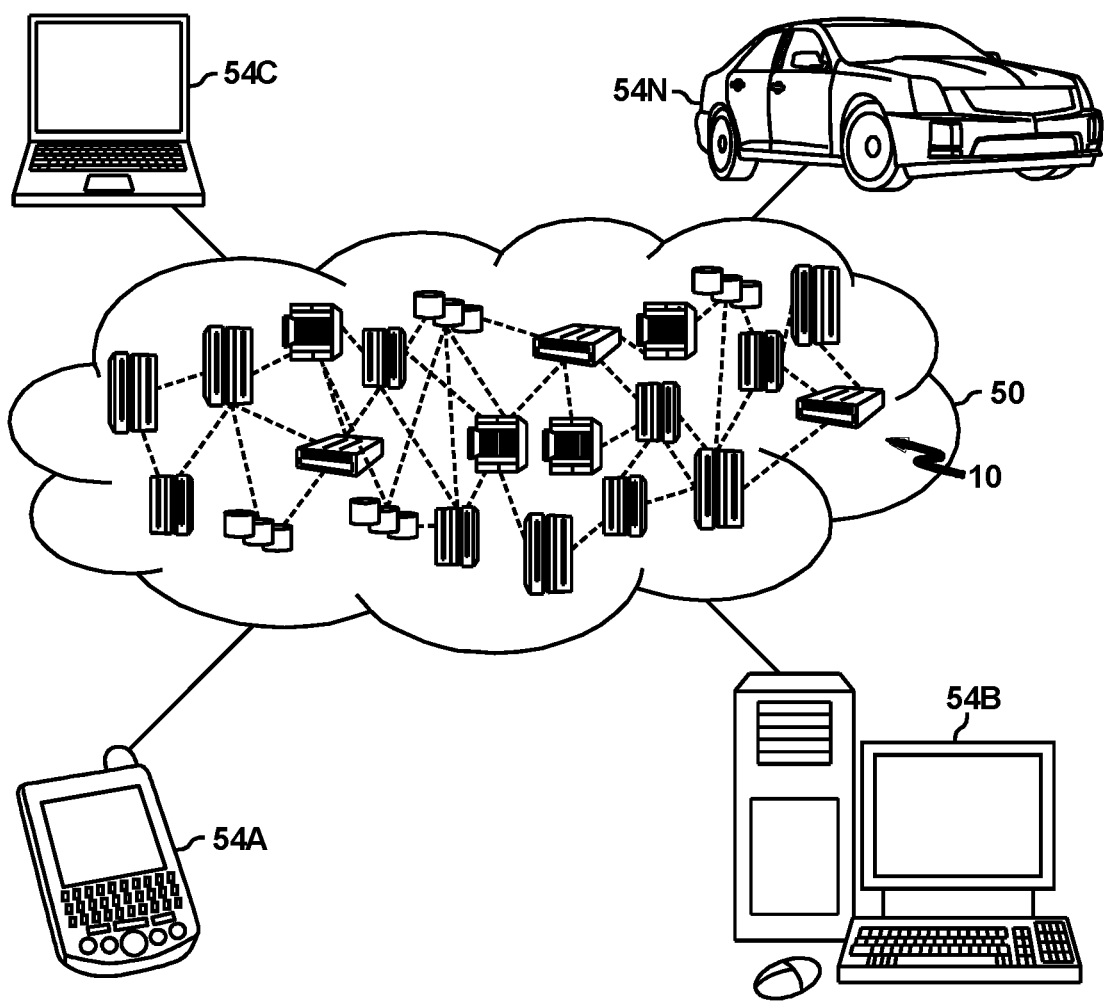
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
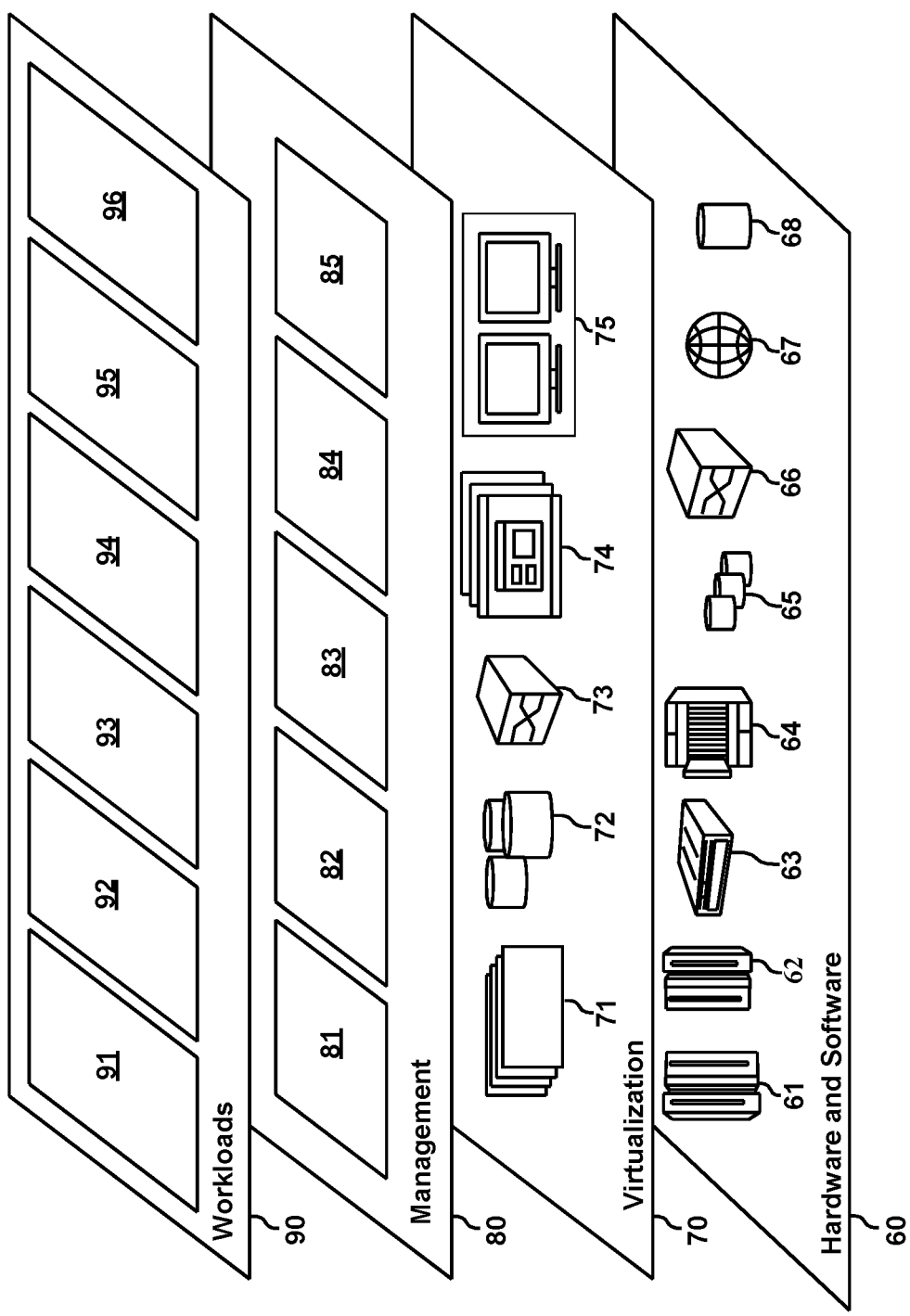
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system 96 for facilitating personalized down-time activities.

Embodiments of the system 96 generate personalized engaging activities for a user experiencing downtime (e.g., waiting in a phone, online, or physical queue; riding as a passenger in a vehicle) based on predicted user experience as a function of (user context, user cohort, context analysis, down-time, and so on) to enhance the user experience with a service provider (e.g., retailer or rideshare operator). The system 96 dynamically determines and generates personalized engaging activities for a user experiencing down-time, based on context, preference and cognitive understanding.

Figure 3:
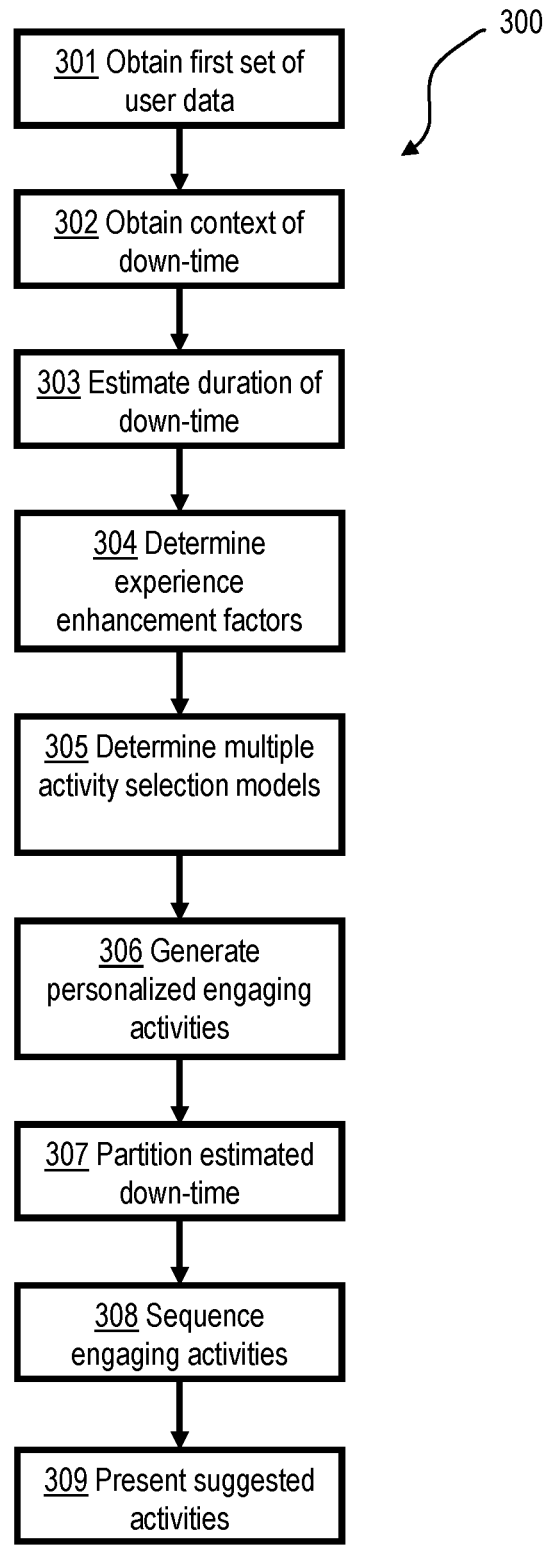
FIG. 3 depicts a method for facilitating personalized down-time activities, according to an exemplary embodiment.
Figure 6:
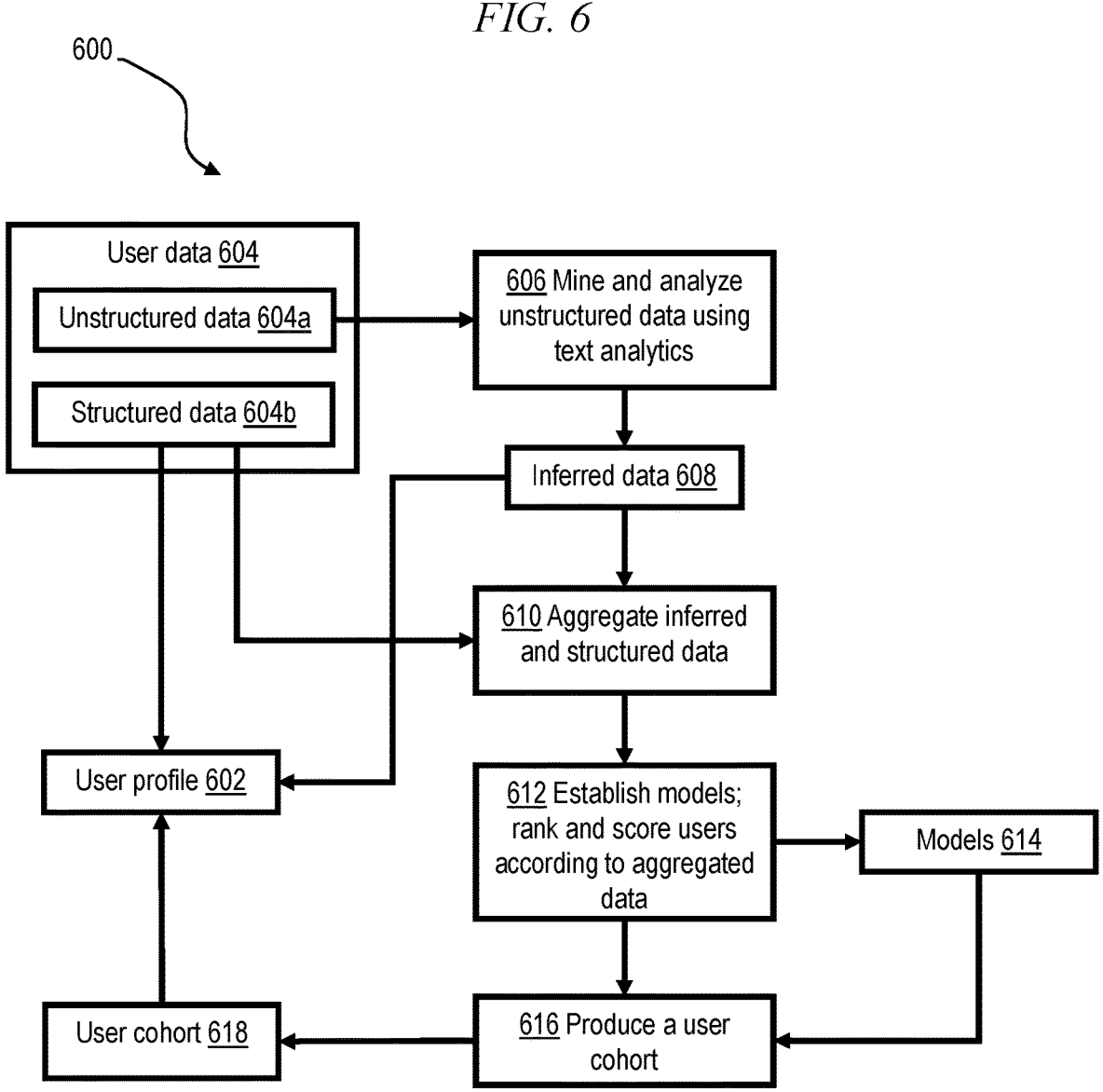
FIG. 6 depicts a method for developing a user profile in connection with the estimated down-time, according to an exemplary embodiment.

In an exemplary embodiment, as depicted in FIG. 3, the system 96 implements a method 300 that includes at 301 obtaining a set of user data (e.g., historical calling record, physiologic sensor data) from which a user profile can be generated according to a method such as the method 600 shown in FIG. 6. At 302 the method 300 further includes obtaining context (e.g., availability of customer service agents, train delays, traffic delays, weather conditions, number of customers in queue, service maintenance requirements) for estimating the duration of a down-time T. At 303 the method 300 includes estimating duration of down-time T, at 304 determining experience enhancement factors (e.g., entertainment preference, context, calendar entries, geo-spatial metrics) based on the user profile and on the estimated down-time T, at 305 determining multiple activity selection models based on the predicted context, the user data, and the experience enhancement factors, and at 306 generating personalized engaging activities for the user, based on the experience enhancement factors, by applying the multiple activity selection models to a plurality of potential activities. At 307 the method 300 includes partitioning the estimated down-time T into N logical segments, at 308 sequencing the engaging activities to fit into the N segments, and at 309 presenting the suggested activities to the user via a computing device.

Personalized activities related to enhancing a user customer experience include: personalized entertainment (e.g., playing contemporary songs, classical music, games, short video), advertisements, educational session about a new product, etc.

For example, the system 96 may run in the background while the user interacts with a service provider system (e.g., voice menu, online chat) so that the system 96 can implement an artificial neural network or similar algorithms to predict and immediately provide personalized activities when the user experiences down-time (customer service hold, etc.). Generally, an artificial neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. An artificial neural network can implement supervised, unsupervised, or semi-supervised machine learning.

In one or more embodiments, at 301 the system 96 engages with the user's wearable devices to better understand the contextual situation with the schedule of the user (monitored from user's mobile device, access to calendar entries, mail, battery, etc.) and geo-spatial metrics to appease the user by providing a down-time activity that is compatible with the user's concurrent activities. For instance, if the user's heart rate is at an elevated level and the GPS location tracks that the user is taking a routine walk in the morning (wearable device, GPS location, date and time combined), in that case, instead of the video or visual content, audio content can be modified to keep the user engaged.

In one or more embodiments, estimating the duration of down-time at 303 includes monitoring available customer service agents, their expected time of completing with their engaged customer, the number of customers in queue, and other characteristics such as predicted service down time, congestion time, etc. In other embodiments, not related to customer service call hold time, estimating down-time includes monitoring real-time traffic conditions and distance to travel to obtain an estimated trip duration in a vehicle not driven by the user (e.g., plane, train, autonomous vehicle).

In one or more embodiments, determining experience enhancement factors at 304 includes detecting previously used effective experience enhancement factors by learning from similar users whose down-time satisfaction was deemed to be improved by detection of mood variations with respect to the activities triggered and provided to the said users by the system. Their engagement level with respect to the said activities decides the current satisfaction level and provision of future activities in order to keep the user engaged. Features used to detect mood variations include, but are not limited to: tone, vocabulary used, sentiment, pitch and volume of user, facial expression, eye gaze and dilation, heart-rate, perspiration, etc. In one or more embodiments, the system 96 also monitors ongoing conversation/interaction of the user with a customer representative or agent, and estimates current and future experience enhancement factors, based on which it will determine appropriate activity types (e.g., entertainment, news, advertisement, educational) and selection criteria. Appropriate activity types are determined based on real time detection of user's behavior via various monitoring tools mentioned in the draft (wearables, mood detection, voice and other features) coupled with training algorithm for continuous feedback learning aids in providing engaging activities for optimization and sustenance of customer satisfaction levels. Multi-dimensional outputs corresponding to the respective set of inputs selected in the system, consisting of context, previous user's behavioral and activity pattern and geo-spatial metrics fed in the proposed neural networks model further assists in providing sequence of activities to the customers accounting for ameliorative steps taken to prevent any recurrent loss in customer's rational behavior. In addition to the above, historic data (e.g., user behavior) is used and unsupervised machine learning approaches are used to identify clusters of users who would be amenable to certain activities. Once there is sufficient amounts of labelled data and user responses or feedback exist on their responses to the activities, supervised methods, collaborative filtering, etc. can be applied. The selection criteria is therefore, determined based on previous set of activities provided based on their success rate in the past as a default option and then personalizing it based on user's behavior inferred from engaging in such activities and/or tasks provided to the said user.

In one or more embodiments, similar users are identified based on user profiles that are produced based on a plurality of user-generated data sources such as previous call logs, past down-time experiences, etc. and stored in a user profile database. The system 96 makes use of user-generated data sources in one or more text/voice-enabled conversational platforms or devices (e.g., call logs, social media profiles, text messages) to compile user characteristics such as the user's languages spoken, location, expertise, hobbies, interests, etc. User-supplied data may include, for example, explicit user preferences (e.g., specific channels or types of activities such as music playing, video watching, etc.), demographics, and/or current and historic cognitive state data, which can be derived from text messages, phone conversations, and social media activities. Publicly available data may include, for example, social media profiles (e.g., FACEBOOK®, LINKEDIN®, blogs, etc.), location information, landmark/maps, service catalog, voice, image repositories, etc. The system 96 may infer a user's preferences from the preferences of users who have profiles otherwise similar to a user's profile. The production of user profiles is further discussed below with reference to FIG. 6.

In one or more embodiments, the system 96 estimates experience enhancement factors in response to factors such as location or geo-spatial context, end user device characteristics, etc. The system 96 may use a plurality of data such as historical calling record data, data from the user computing devices (e.g., smartwatch, mobile device, etc.), data that enable to learn activity/task preference of the user at a particular context (e.g., time of the day), analyzing historical in-call engaging activities of the user, including: entertainment (e.g., music, poems, videos, images, etc.), educational material (e.g., facts, lectures, audiobooks), radio or podcasts, alerts or news (e.g., alerts of relevant information such as athletic scores, stock market changes, new technology), etc.

Further, in determining experience enhancement factors the system 96 takes into consideration the user cognitive state (e.g., emotional activation or distraction level) and/or behavior (e.g., erratic behavior), estimated preferences, etc. By a way of implementation, the user cognitive state and behavior can be measured by converting the voice or speech into text, sampling segments in real time, and applying multiple learning models that are trained using data collected over a period of time and algorithms (e.g., IBM's Watson Tone Analyzer).

In one or more embodiments, in generating personalized engaging activities at 306, the system 96 applies the activity types and selection criteria over all the activities that have been suggested in the past learned from the neural network model, which was trained based on logged traces of improved customer experience. It then determines what activity to play or present, sequence of activities, or what amelioration action to trigger for the user, etc. to enhance the user's customer experience.

In one or more embodiments, algorithms such as collaborative filtering and restricted Boltzmann machines are used to filter customer's past activities or a set of activity affinities from similar customers to generate personalized down-time activities. To identify relevant preferences for a customer, a correlation-based similarity measure between two customers u and v can be used, or alternatively compute a distance between two preferences i and j in dimensions such as musical genre, duration, maturity rating and social media information followed or subscribed by said users, hobbies including reading/writing articles, solving puzzles, inclusive of interest in activities like dancing as opposed to studying technology news etc. This can be measured by computing a similarity metric like Pearson correlation or other correlation-based similarities.

The user's cognitive state and interests can be fed as inputs to the self-learning system, which is backed by the neural network model and other learning algorithms mentioned above. Other inputs can include: thresholds of mood variations and sequence of activities provided to the user; time duration available for engaging in an activity; pattern history of the user highlighting the user's likelihood to engage in a particular activity, detected from social media information, age and hobbies of the user. Based on the inputs, the self-learning system determines the sequence of activities to be provided or suggested to the said user. Thus, the models and/or algorithms behind the self-learning system use the trained data in order to keep the customer engaged and thereby, keep the mood variations of the user under control. Initially, the user can be given an option to choose from multiple activities which the user can select by pressing certain keys on the phone or by saying some keywords which can be detected by the system. Once that is recorded, the mood variations of the user are studied in real time while the user engages in a specific activity which builds the continuous feedback learning and pattern history of the user. The time of switching from one activity to another is also detected to determine the interests of the user (e.g., solving puzzles, listening to music, writing certain notes) such that similar activities with slight variations can be provided to the user the next time.

Figure 4:
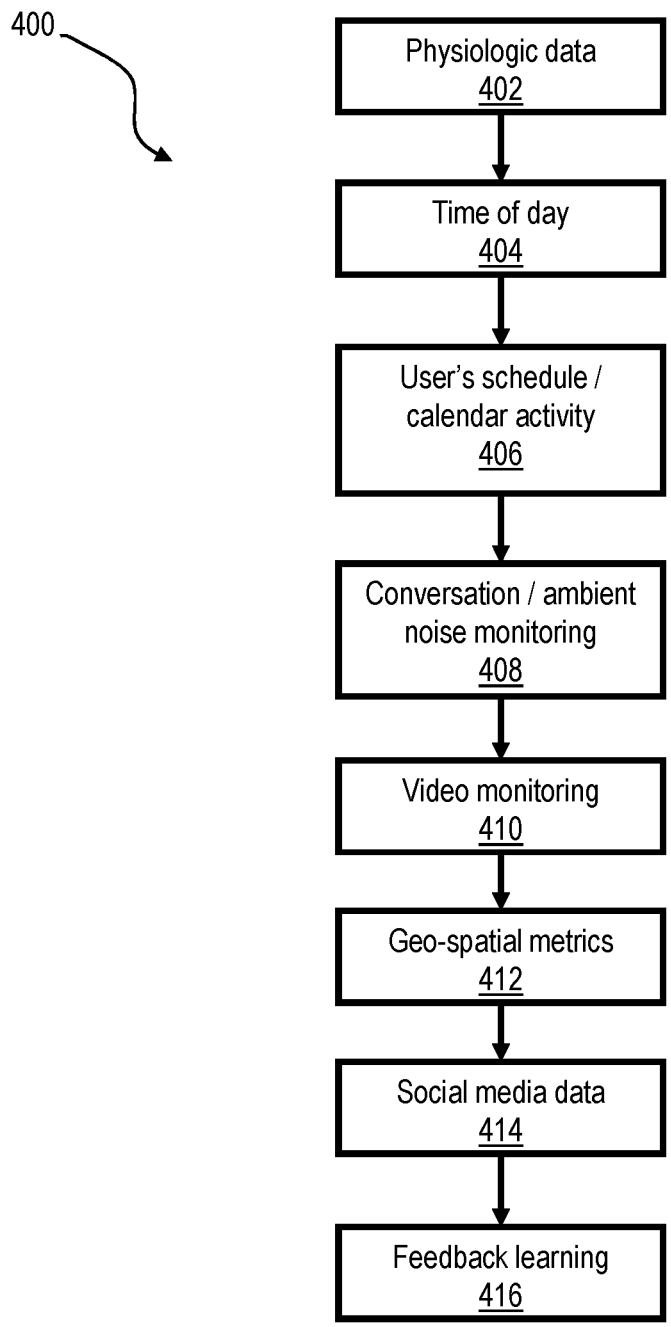
FIG. 4 depicts a cognitive state detection workflow in connection with an estimated down-time, according to an exemplary embodiment.

In one or more embodiments, understanding the user cognitive state, with a certain confidence level C, makes use of a multi-layer neural network model or supervised machine learning model, for instance, logistic regression model with regularization in order to understand and classify the cognitive state of the user and the current mood of the user in order to determine a suitable down-time activity. Classification of the cognitive state includes, for example, analyzing real-time interaction/engagement pattern/sequence; facial expression using inputs received from the front camera of the user smartphone or nearby camera, etc.; analyzing a plurality of user activities that may include conversations (e.g., text messages, notifications, and emails received), joint analysis of phone calls received, etc.; and, inferring distraction level (e.g., user is working on the laptop device while talking on the phone) based on the above analyses. Other input parameters for understanding the cognitive state of the user, as shown in the workflow 400 of FIG. 4, may include:

Physiologic data of the user 402 (monitored using wearables and related devices).

Time of the day 404.

User's schedule or calendar activity 406.

Conversation/ambient noise monitoring 408.

Video monitoring 410.

Geo-spatial metrics 412.

Social media profile information 414.

Feedback learning 416.

Referring again to FIG. 3, in one or more embodiments, at 309 the system 96 presents a visual gaming experience while a user is waiting in a virtual queue. For instance, a Sudoku game can be launched on a mobile device. As the user's mood varies with segments of time passing away, the visual and audio UI experience can be changed in conjunction with the contextual situation. For instance, a gaming portal can be provided to the user while the user is on speaker phone. In addition, the method of selecting the visual (e.g., visual gaming) and audio UI experience for the waiting user in the virtual queue further evaluating if the user mobile device is capable of running the content of the visual and audio UI experience.

In one or more embodiments, at 309 the system 96 morphs audio content to satisfy a user's down-time experience. Some examples of audio content morphing can include dynamically playing music based on monitoring the user's playlist and other music applications, playing a podcast or formulating a questionnaire based on the user's social media postings about hobbies or interests, or similar activity monitoring scenarios.

Figure 5:
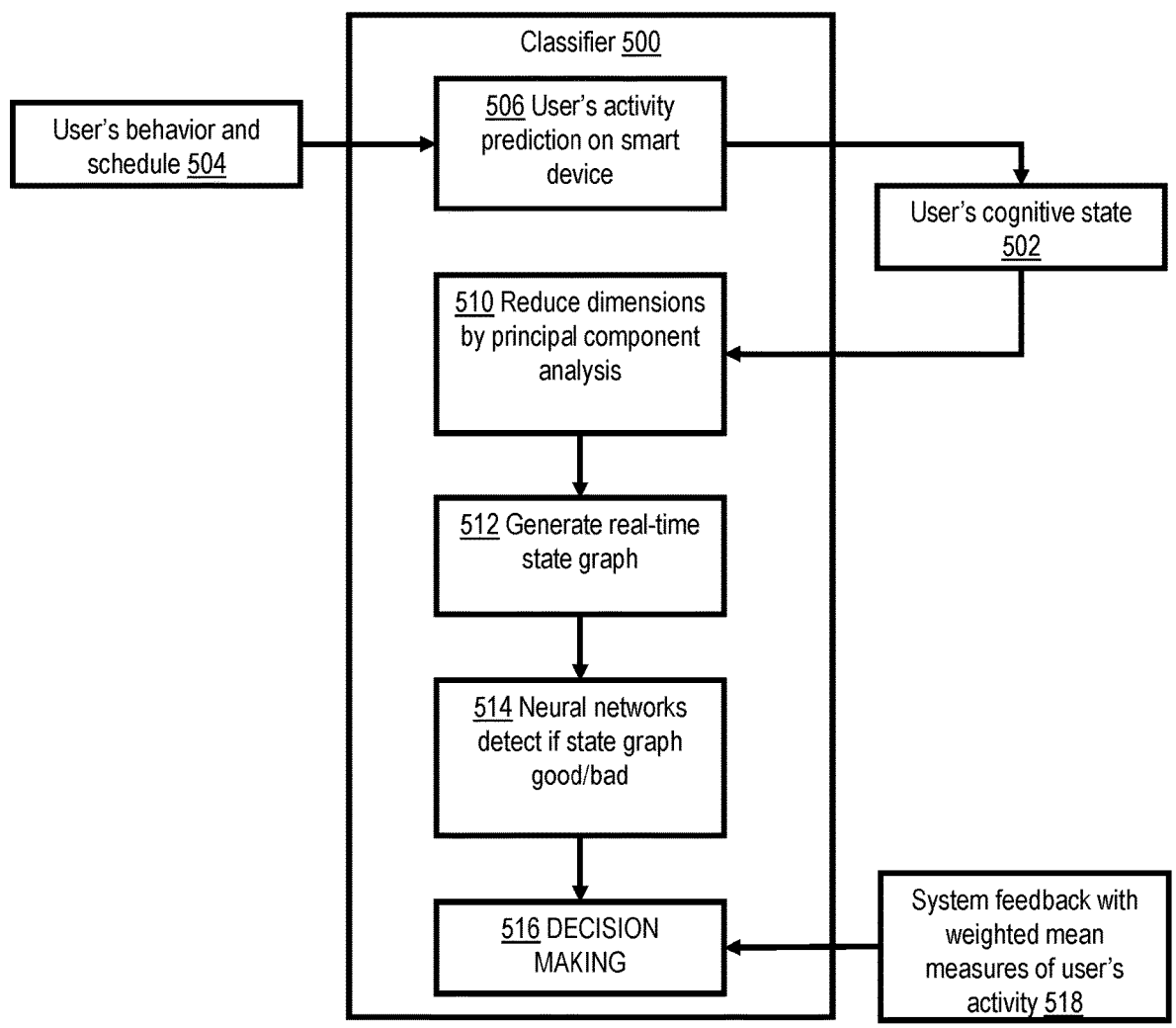
FIG. 5 depicts use of a classifier to characterize a user's profile and cognitive state in connection with the estimated down-time, according to an exemplary embodiment.

Referring now to FIG. 5, in one or more embodiments the system 96 uses a classifier 500 to characterize a cognitive state 502 of the user, based on the user's behavior and schedule 504. The cognitive state 502 helps guide generation of rules for effective micro-task selection and instantiation. As another example, IBM's Watson Tone Analyzer can be leveraged to assess the progress of a communication involving the user.

As shown in FIG. 5, the classifier 500 receives indications of the user's behavior and schedule 504 such as but not limited to phone usage, movement, etc. This can be received in real-time in or offline and be numeric and textual in format and contain data like amount of time spent on an app, location, distance travelled, etc. At 506 (user activity prediction) the classifier 500 labels the behavior 504 to predict the user's activity and then assigns a cognitive state 502 to these labels. In 510, the classifier 500 converts the labelled data with activities and cognitive states into a set of values of linearly uncorrelated variables called principal components. This works so that the first principal component has the highest variance so that it accounts for as much of the variability in the data as possible, and each succeeding component in turn has subsequent variances. This has the property of finding the key varying cognitive states and activities within the data. This is used to create a state graph with previous cognitive states in 512 and passed through a neural network at 514 to determine whether the cognitive state transitions would leave the user in a good/bad state. Thus, the classifier 500 detects the on-hold customer's intermediate satisfaction levels by generating a training model via principal component analysis 510 for reduced complexity in terms of dimensions and input features. Principal component analysis is a technique for reducing the dimensionality of datasets, increasing interpretability but at the same time minimizing information loss. It does so by creating new uncorrelated variables that successively maximize variance. Principal component analysis advantageously eliminates duplication in the data. The classifier 500 detects dynamic positive or negative user experience based on real time analytics. This will be used as input to a decision making process at 516, in order to dynamically reconfigure the appropriate activities or selectable items in order to provide incentives for the customer and ameliorate the customer experience.

Finally, at 518 a system feedback routine checks the wait time polling being done with respect to the user's cognitive levels, interests, and the user computing device characteristics in relation to activities that the user has performed during the present down-time.

As previously mentioned, similar users can be identified based on user profiles that are produced based on a plurality of user-generated data sources such as previous call logs, past down-time experiences, etc. and stored in a user profile database. FIG. 6 depicts a method 600 for developing a user profile 602 from user data 604, according to an exemplary embodiment.

In FIG. 6, the user data 604 includes unstructured data 604a and structured data 604b. The unstructured data 604a includes, for example, online and social media data; device usage data (e.g., keystrokes, accelerometer); contextual data (e.g., time, location); and historic data (e.g., call logs, text message logs). The structured data 604b includes data provided by the user in response to structured forms or questionnaires. At 606, the system 96 extracts the unstructured data using text analytics in order to infer interests and preferences (inferred data 608). At 610, the inferred data 608 is aggregated with the structured data 604b. At 612, models 614 are established to rank and score users according to their structured data 604b and their inferred data 608, and at 616 the models 614 are used to produce a user cohort 618. The user profile 602 incorporates the structured data 604b, the inferred data 608, and the user cohort 618.

Given the discussion thus far, it will be appreciated that, in general terms, an exemplary method, according to an aspect of the invention, includes producing a user profile in response to user data; obtaining context for estimating the duration of a down-time; determining, using the context, an estimated duration of the down-time; determining experience enhancement factors in response to the user profile and the estimated duration of the down-time; determining activity selection models in response to the context, the user data, and the experience enhancement factors; generating personalized engaging activities by applying the activity selection models to a plurality of potential activities; partitioning the estimated duration of the down-time into segments; sequencing the personalized engaging activities to fit into the segments; and presenting the personalized engaging activities to the user via a computing device. In one or more embodiments, the user data includes unstructured data and structured data. In one or more embodiments, the method includes inferring interests and preferences by extracting and analyzing the unstructured data. In one or more embodiments, the method includes aggregating the interests and preferences with the structured data. In one or more embodiments, the method includes establishing models to rank users according to the aggregation of interests and preferences with the structured data. In one or more embodiments, the method includes producing a user cohort by using the models. In one or more embodiments, the method includes obtaining the user data.

Figure 7:
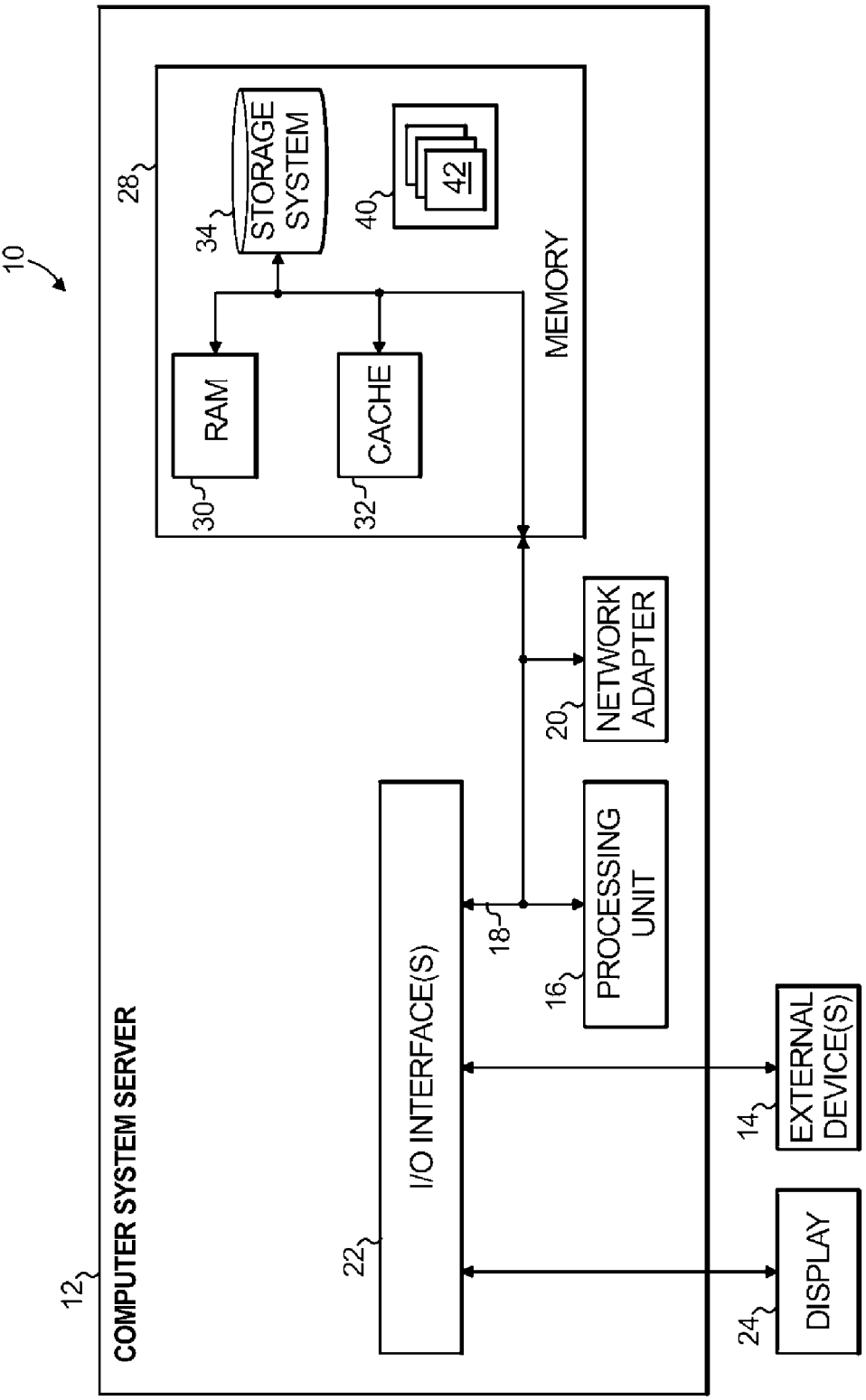
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to facilitate exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    producing a user profile in response to user data;
    obtaining context for estimating a duration of a down-time;
    determining, using the context, an estimated duration of the down-time;
    determining experience enhancement factors in response to the user profile and the estimated duration of the down-time;
    determining an activity selection model in response to the context, the user data, and the experience enhancement factors;
    generating personalized engaging activities by applying the activity selection model to a plurality of potential activities;
    partitioning the estimated duration of the down-time into segments;
    sequencing the personalized engaging activities to fit into the segments; and
    presenting the personalized engaging activities to the user via a computing device.

2. The method of claim 1 wherein the user data includes unstructured and structured data.

3. The method of claim 2 further comprising inferring interests and preferences by extracting and analyzing the unstructured data.

4. The method of claim 3 further comprising aggregating the interests and preferences with the structured data.

5. The method of claim 4 further comprising establishing models to rank users according to the aggregation of interests and preferences with the structured data.

6. The method of claim 5 further comprising producing a user cohort by using the models.

7. The method of claim 1 further comprising:
    measuring an ongoing degree of user engagement by at least one of monitoring a conversation, analyzing user-activity affinity, or analyzing user-selectable-items affinity;
    dynamically generating a secondary set of activities; and
    adjusting the sequenced activities using the secondary set of activities.

8. A non-transitory computer readable medium embodying computer executable instructions which when executed by a computer cause the computer to facilitate the method of:
    establishing a virtual queue of users currently on hold with a service provider system;
    producing a user profile for a given user in the virtual queue using user data obtained by the service provider system during a previous interaction with the given user;
    obtaining a context of the service provider system;
    estimating a duration of the hold for the given user using the context;
    determining experience enhancement factors in response to the user profile and the duration of the hold;

determining an activity selection model using the context, the user profile, and the experience enhancement factors;

generating personalized engaging activities by applying the activity selection model to a plurality of potential activities;

determining a sequence of the personalized engaging activities; and presenting one or more of the personalized engaging activities to the given user in the determined sequence for the duration of the hold.

9. The computer readable medium of claim 8 wherein the user data includes unstructured data and structured data.

10. The computer readable medium of claim 9 further comprising instructions for inferring interests and preferences of the given user by extracting and analyzing the unstructured data.

11. The computer readable medium of claim 10 further comprising instructions for aggregating the interests and preferences with the structured data.

12. The computer readable medium of claim 11 further comprising instructions for establishing models to rank the users in the virtual queue according to the aggregation of interests and preferences with the structured data.

13. The computer readable medium of claim 12 further comprising instructions for producing a user cohort by using the models.

14. An apparatus comprising:
a memory embodying computer executable instructions; and
at least one processor, coupled to the memory, and operative by the computer executable instructions to facilitate a method of:
establishing a virtual queue of users currently on hold with a service provider system;
producing a user profile for a given user in the virtual queue using user data obtained by the service provider system during a previous interaction with the given user;
obtaining a context of the service provider system;
estimating a duration of the hold for the given user using the context;
determining experience enhancement factors in response to the user profile and the duration of the hold;
determining an activity selection model using the context, the user profile, and the experience enhancement factors;
generating personalized engaging activities by applying the activity selection model to a plurality of potential activities;
determining a sequence of the personalized engaging activities; and
presenting one or more of the personalized engaging activities to the given user in the determined sequence for the duration of the hold.

15. The apparatus of claim 14 wherein the user data includes unstructured data and structured data.

16. The apparatus of claim 15 wherein the processor is operative to facilitate inferring interests and preferences of the given user by extracting and analyzing the unstructured data.

17. The apparatus of claim 16 wherein the processor is operative to facilitate aggregating the interests and preferences with the structured data.

18. The apparatus of claim 17 wherein the processor is operative to facilitate establishing models to rank the users in the virtual queue according to the aggregation of interests and preferences with the structured data.

19. The apparatus of claim 18 wherein the processor is operative to facilitate producing a user cohort by using the models.

20. The apparatus of claim 14 wherein the processor is operative to facilitate obtaining the user data.

* * * * *